United States Patent
Ishikawa et al.

(10) Patent No.: US 9,080,021 B2
(45) Date of Patent: Jul. 14, 2015

(54) POLYCARBONATE-POLYORGANOSILOXANE COPOLYMER AND METHOD FOR PRODUCING SAME

(71) Applicant: IDEMITSU KOSAN CO., LTD., Chiyoda-ku (JP)

(72) Inventors: Yasuhiro Ishikawa, Ichihara (JP); Yukiko Nagao, Ichihara (JP); Hiroaki Motegi, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/352,889

(22) PCT Filed: Oct. 15, 2012

(86) PCT No.: PCT/JP2012/076621
§ 371 (c)(1),
(2) Date: Apr. 18, 2014

(87) PCT Pub. No.: WO2013/058214
PCT Pub. Date: Apr. 25, 2013

(65) Prior Publication Data
US 2014/0256888 A1    Sep. 11, 2014

(30) Foreign Application Priority Data

Oct. 18, 2011  (JP) ................. 2011-229108

(51) Int. Cl.
| | |
|---|---|
| C08G 64/00 | (2006.01) |
| C08G 77/60 | (2006.01) |
| C08L 69/00 | (2006.01) |
| C08G 64/18 | (2006.01) |
| C08G 77/448 | (2006.01) |
| C08G 63/02 | (2006.01) |

(52) U.S. Cl.
CPC .............. *C08G 77/60* (2013.01); *C08G 64/186* (2013.01); *C08G 77/448* (2013.01); *C08L 69/00* (2013.01); *C08L 2205/02* (2013.01)

(58) Field of Classification Search
CPC ..................................................... C08G 77/60
USPC ................... 428/412; 525/454; 528/196, 198
See application file for complete search history.

(56) References Cited

FOREIGN PATENT DOCUMENTS

| | | |
|---|---|---|
| JP | 6 100684 | 4/1994 |
| JP | 8 81620 | 3/1996 |
| JP | 8 169947 | 7/1996 |
| JP | 10 245711 | 9/1998 |
| JP | 2005 60599 | 3/2005 |
| JP | 2005 535761 | 11/2005 |
| JP | 2006 518803 | 8/2006 |
| JP | 2011 46911 | 3/2011 |
| JP | 2011 46913 | 3/2011 |
| JP | 2011-46913 | * 3/2011 |
| JP | 2012 153824 | 8/2012 |
| WO | WO 2014/058033 A1 | 4/2014 |

OTHER PUBLICATIONS

International Search Report Issued Nov. 13, 2012 in PCT/JP12/076621 Filed Oct. 15, 2012.
U.S. Appl. No. 14/362,375, filed Jun. 2, 2014, Ishikawa et al.
U.S. Appl. No. 14/362,335, filed Jun. 2, 2014, Ishikawa et al.
U.S. Appl. No. 14/352889, filed Apr. 18, 2014, Ishikawa et al.
Extended European Search Report dated Apr. 29, 2015, in European Patent Application No. 12842096.5.

* cited by examiner

*Primary Examiner* — Terressa Boykin
(74) *Attorney, Agent, or Firm* — Oblon, McClelland, Maier & Neustadt, L.L.P.

(57) ABSTRACT

Provided is a polycarbonate-polyorganosiloxane copolymer having high impact resistance and excellent transparency, in particular, a high total light transmittance and a small haze, and a method of producing thereof. Specifically, provided is a polycarbonate-polyorganosiloxane copolymer, containing a main chain having a repeating unit represented by the following general formula (I) and a constituent unit represented by the following general formula (II), in which: n in the general formula (II) is 25 to 50; and the copolymer satisfies the following conditions (a) and (b): (a) a molded article having a thickness of 2 mm made of the copolymer has a total light transmittance measured based on ISO 13468 of 88% or more and a haze measured based on ISO 14782 of 0.7% or less; and (b) a molded article having a thickness of 3 mm made of the copolymer has a total light transmittance measured based on ISO 13468 of 88% or more and a haze measured based on ISO 14782 of 1.0% or less.

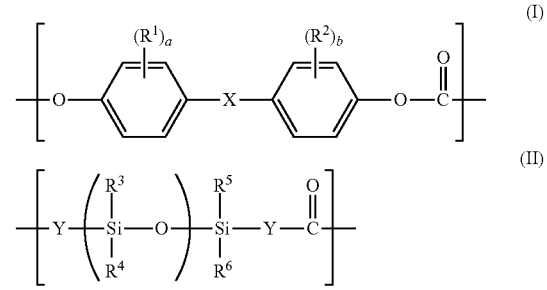

(In the formulae, $R^1$ and $R^2$ each independently represent a halogen atom, an alkyl group or an alkoxy group, X represents a single bond, an alkylene group, an alkylidene group, a cycloalkylene group, a cycloalkylidene group, —S—, —SO—, —SO$_2$—, —O— or —CO—, and a and b each independently represent an integer of 0 to 4. $R^3$ to $R^6$ each independently represent a hydrogen atom, a halogen atom, an alkyl group, an alkoxy group or an aryl group, Y represents a single bond, or an organic residue containing an aliphatic or aromatic moiety, and n represents an average repetition number.)

7 Claims, 1 Drawing Sheet

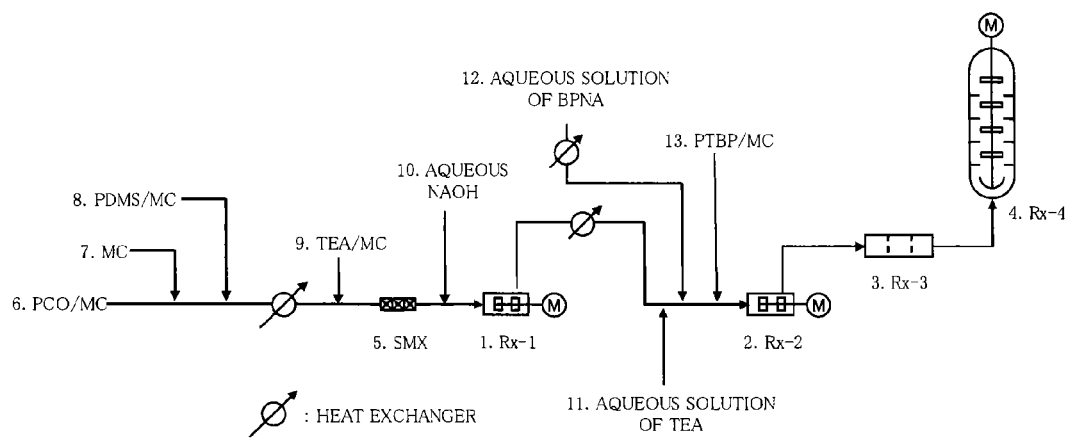

POLYCARBONATE-POLYORGANOSILOXANE COPOLYMER AND METHOD FOR PRODUCING SAME

TECHNICAL FIELD

The present invention relates to a polycarbonate-polyorganosiloxane copolymer and a method of producing the copolymer.

BACKGROUND ART

A polycarbonate-polyorganosiloxane polymer (hereinafter sometimes referred to as "PDMS-PC") has been attracting attention because of its high impact resistance, high chemical resistance, and high flame retardancy, and the polymer has been expected to find utilization in a wide variety of fields such as the field of electrical and electronic equipment, and the field of an automobile. In particular, the copolymer is being more and more widely utilized in the casings of a mobile phone, a mobile personal computer, a digital camera, a video camera, an electric power tool, and the like, and in other articles for daily use.

Meanwhile, in recent years, additionally high transparency has be required in terms of design and functions. For example, a mobile phone button preferably has high transparency so that a character or number printed on a back surface can be viewed more clearly. With regard to the casing of a mobile phone, digital camera, or mobile personal computer, an external appearance having a higher transparency is preferably obtained when the casing is colored with a dye or painted from its back surface. In addition, a material to be used in the window of a meter or the like required to have visibility or in a member required to have light permeability is required to have high transparency, not only in terms of design. Accordingly, a large number of improvements have been attempted with a view to imparting additional transparency to a material using the PDMS-PC.

It has been found that a PDMS-PC having a relatively short chain length, specifically, a PDMS-PC in which the repetition number (n) of organosiloxane units is 60 or less is desirably used for obtaining a PDMS-PC excellent in transparency. For example, there has been known a polycarbonate-polyorganosiloxane block copolymer in which the repetition number (n) of organosiloxane units is 60 or less and which is suitable for molding a transparent visor for a helmet (see Patent Document 1). In addition, a polycarbonate-polyorganosiloxane block copolymer in which the repetition number (n) of organosiloxane units is 30 has been known as a constituent component of a polycarbonate resin composition excellent in heat stability, flowability, and flame retardancy (see Patent Document 2).

However, transparency obtained merely by using a PDMS-PC having a short chain length is insufficient in some cases, and hence an improvement concerning a producing method for a PDMS-PC has also been investigated. A structure in which organosiloxanes are linked to each other through phosgene causes a reduction in transparency. Accordingly, the following method of improving the transparency has been known. A polycarbonate oligomer and a polydimethylsiloxane (hereinafter sometimes referred to as "PDMS") are caused to react with each other in a state where phosgene is substantially absent to eliminate a structure in which the PDMS's are linked to each other through phosgene. For example, there has been known a silicone-polycarbonate block copolymer having a haze of about less than 10, the copolymer being obtained by producing a polycarbonate oligomer having a terminal chloroformate group with a phase-transfer catalyst and then adding a hydroxyaryl-terminated polydiorganosiloxane (see Patent Document 3). However, the copolymer has been inferior in both total light transmittance and haze to a polycarbonate obtained from bisphenol A (BPA) and phosgene (hereinafter referred to as "BPA-PC"), and its transparency has been insufficient as compared with that of the BPA-PC.

In addition, the following method of producing a silicone-containing copolycarbonate in which transparency is maintained in spite of a relatively long siloxane chain length has been provided. A hydroxy-terminated polycarbonate oligomer is brought into contact with a siloxane bischloroformate having a residual hydroxy terminal group at less than 10% under an interface reaction condition to produce a silicone-containing polycarbonate intermediate, and then the intermediate is caused to react with BPA, p-t-butylphenol (PTBP), and phosgene under an interface reaction condition to provide the silicone-containing copolycarbonate (see Patent Document 4). However, it cannot be said that the copolycarbonate has transparency comparable to that of the BPA-PC.

In addition, it has been known that excellent transparency and excellent physical properties are obtained by producing an aromatic bischloroformate while maintaining a pH within the range of about 3 to about 8 and using the aromatic bischloroformate in the production of a siloxane-polycarbonate copolymer (see Patent Document 5). More specifically, the ratio of the mol % of a chloroformate group to the mol % of a phenol-based terminal group of a polydiorganosiloxane is set to 4 or more. However, the copolymer has been inferior in both total light transmittance and haze to the BPA-PC, and its transparency has been insufficient as compared with that of the BPA-PC.

A method involving improving the reaction result of the PDMS has also been proposed as a method of improving the transparency.

For example, a method involving controlling the flow of a raw material to continuously produce a transparent polycarbonate-polyorganosiloxane block copolymer has been known (see Patent Document 6). Specifically, the method involves: continuously mixing a polycarbonate oligomer and a polyorganosiloxane under such a condition that an alkaline compound is substantially absent; then subjecting the mixture to a reaction in the presence of the alkaline compound to produce a polycarbonate-polyorganosiloxane copolymer oligomer; and then causing the resultant polycarbonate-polyorganosiloxane copolymer oligomer and BPA to react with each other in the presence of the alkaline compound. However, satisfactory transparency has not been obtained even by the method.

In addition, a polycarbonate-polyorganosiloxane copolymer characterized in that an average domain size is 5 to 40 nm, a normalized dispersity is 40% or less, and a total light transmittance is 88% or more has been recently reported (see Patent Document 7). However, such values can be achieved even by a conventionally known method (see, for example, Patent Document 8), and hence a further improvement in transparency, in particular, a reduction in haze has been desired.

CITATION LIST

Patent Document

[Patent Document 1] JP 10-245711 A
[Patent Document 2] JP 08-81620 A
[Patent Document 3] JP 08-169947 A

[Patent Document 4] JP 2005-535761 W
[Patent Document 5] JP 2006-518803 W
[Patent Document 6] JP 06-100684 A
[Patent Document 7] JP 2011-46911 A
[Patent Document 8] JP 2005-60599 A

SUMMARY OF INVENTION

Technical Problem

In view of the foregoing, an object of the present invention is to provide a polycarbonate-polyorganosiloxane copolymer having high impact resistance and excellent transparency, in particular, a high total light transmittance and a small haze, and a method of producing thereof.

Solution to Problem

As a result of their extensive studies, the inventors of the present invention have revealed that when a polysiloxane chain length in a polyorganosiloxane-polycarbonate copolymer is short, a strength is hardly obtained, and hence the polysiloxane chain length needs to be equal to or more than a certain length for obtaining impact resistance, and that when the polysiloxane chain length is long, transparency reduces, though a good strength is obtained, and the inventors have found that under a specific condition, excellent transparency can be imparted to the polyorganosiloxane-polycarbonate copolymer while its characteristics are maintained.

That is, the present invention relates to the following items [1] to [13].

[1] A polycarbonate-polyorganosiloxane copolymer, containing a main chain having a repeating unit represented by the following general formula (I) and a constituent unit represented by the following general formula (II), in which:
n in the general formula (II) is 25 to 50; and
the polycarbonate-polyorganosiloxane copolymer satisfies the following conditions (a) and (b):
(a) a molded article having a thickness of 2 mm made of the copolymer has a total light transmittance measured based on ISO 13468 of 88% or more and a haze measured based on ISO 14782 of 0.7% or less; and
(b) a molded article having a thickness of 3 mm made of the copolymer has a total light transmittance measured based on ISO 13468 of 88% or more and a haze measured based on ISO 14782 of 1.0% or less:

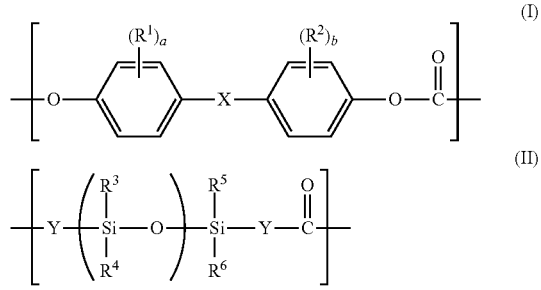

in the formulae:
$R^1$ and $R^2$ each independently represent a halogen atom, an alkyl group having 1 to 6 carbon atoms, or an alkoxy group having 1 to 6 carbon atoms;
X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—;
a and b each independently represent an integer of 0 to 4;
$R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms;
Y represents a single bond, or an organic residue containing an aliphatic or aromatic moiety; and
n represents an average repetition number.

[2] The polycarbonate-polyorganosiloxane copolymer according to the item (1) in which in the constituent unit represented by the general formula (II), Y represents an organic residue derived from allylphenol or eugenol.

[3] The polycarbonate-polyorganosiloxane copolymer according to the item [1] or [2], in which in the repeating unit represented by the general formula (I), X represents an isopropylidene group and a=b=0.

[4] The polycarbonate-polyorganosiloxane copolymer according to any one of the items [1] to [3], in which in the constituent unit represented by the general formula (II), each of $R^3$ to $R^6$ represents a methyl group.

[5] A polycarbonate-based resin composition, comprising a polycarbonate resin composed of 5 to 100 mass % of the polycarbonate-polyorganosiloxane copolymer (A-1) according to any one of the items [1] to [4] and 0 to 95 mass % of an aromatic polycarbonate (A-2) except the (A-1).

[6] A molded article, formed by molding the polycarbonate-based resin composition according to the item [5].

[7] A component for electrical and electronic equipment, made from the polycarbonate-based resin composition according to the item [5].

[8] A component for an automobile, made from the polycarbonate-based resin composition according to the item [5].

[9] An article for daily use, made from the polycarbonate-based resin composition according to the item [5].

[10] A method of producing a polycarbonate-polyorganosiloxane copolymer of any one of the items [1] to [4], the method comprising the steps of:
(i) continuously or intermittently supplying a polycarbonate oligomer having the repeating unit represented by the general formula (I) and a water-insoluble organic solvent, and a polyorganosiloxane represented by the following general formula (2) and the water-insoluble organic solvent, followed by mixing in the absence of a polymerization catalyst and in the absence of an alkaline compound excluding a tertiary amine and a quaternary ammonium salt;
(ii) continuously or intermittently supplying and mixing the polymerization catalyst into a mixed liquid obtained in the step (i) in the absence of the alkaline compound excluding a tertiary amine and a quaternary ammonium salt;
(iii) continuously or intermittently supplying and mixing an alkaline compound aqueous solution into a mixed liquid obtained in the step (ii) to perform preliminary polymerization while setting a concentration of the alkaline compound aqueous solution to be supplied to 2 to 15 mass %; and
(iv) cooling a preliminary polymerization liquid obtained in the step (iii) to 25° C. or less, followed by continuous or intermittent supply and mixing of the polymerization catalyst, an alkaline compound aqueous solution of a dihydric phenol compound represented by the following general formula (1), and a molecular weight modifier into the liquid to perform main polymerization, followed by continuous or intermittent extraction of the resultant polymerization reaction liquid from a reactor:

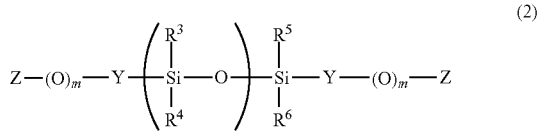

(2)

in the formula:

$R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms;

Y represents a single bond, or an organic residue containing an aliphatic or aromatic moiety;

n represents an average repetition number;

Z represents a halogen atom, —$R^7$OH, —$R^7$—Z'—$R^8$—OH, —$R^7$COOH, —$R^7$NH$_2$, —COOH, or —SH, the $R^7$ represents a substituted or unsubstituted alkylene group, a substituted or unsubstituted cycloalkylene group, or a substituted or unsubstituted arylene group, the $R^8$ represents an arylene group having 6 to 12 ring-forming carbon atoms, and the Z' represents an alkylene group having 1 to 8 carbon atoms, an alkylidene group having 2 to 8 carbon atoms, a cycloalkylene group having 5 to 10 carbon atoms, or a cycloalkylidene group having 5 to 10 carbon atoms; and m represents 0 or 1;

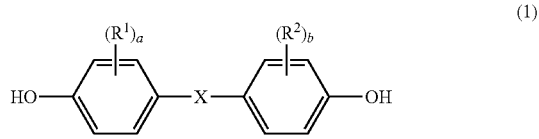

(1)

in the formula:

$R^1$ and $R^2$ each independently represent a halogen atom, an alkyl group having 1 to 6 carbon atoms, or an alkoxy group having 1 to 6 carbon atoms;

X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—; and a and b each independently represent an integer of 0 to 4.

[11] The method of producing a polycarbonate-polyorganosiloxane copolymer according to the item [10], in which a terminal of the polycarbonate oligomer to be used in the step (i) contains a chloroformate group.

[12] The method of producing a polycarbonate-polyorganosiloxane copolymer according to the item [10] or [11], in which the polymerization catalyst to be used in the step (ii) includes a tertiary amine or a quaternary ammonium salt, or a methylene chloride solution thereof.

[13] The method of producing a polycarbonate-polyorganosiloxane copolymer according to any one of the items [10] to (12), in which the water-insoluble organic solvent is methylene chloride.

Advantageous Effects of Invention

According to the present invention, it is possible to provide the polycarbonate-polyorganosiloxane copolymer having high impact resistance (more specifically, impact resistance at low temperature (about –30° C.)) and excellent transparency, in particular, a high total light transmittance and a small haze.

In terms of transparency, it is possible to provide the following polycarbonate-polyorganosiloxane copolymer. A molded article having a thickness of 2 mm made of the copolymer has a total light transmittance measured based on ISO 13468 of 88% or more and a haze measured based on ISO 14782 of 0.7% or less, or a molded article having a thickness of 3 mm thereof has a total light transmittance measured based on ISO 13468 of 88% or more and a haze measured based on ISO 14782 of 1.0% or less.

BRIEF DESCRIPTION OF DRAWINGS

FIG. 1 is a schematic view of an apparatus for producing a polycarbonate-polyorganosiloxane copolymer used in Examples.

DESCRIPTION OF EMBODIMENTS

[Polycarbonate-Polyorganosiloxane Copolymer (A-1)]

The present invention relates to a polycarbonate-polyorganosiloxane copolymer (A-1), containing a main chain having a repeating unit represented by the following general formula (I) and a constituent unit represented by the following general formula (II), in which: n in the general formula (II) is 25 to 50; and the copolymer satisfies the following conditions (a) and (b).

(a) A molded article having a thickness of 2 mm made of the copolymer has a total light transmittance measured based on ISO 13468 of 88% or more and a haze measured based on ISO 14782 of 0.7% or less.

(b) A molded article having a thickness of 3 mm made of the copolymer has a total light transmittance measured based on ISO 13468 of 88% or more and a haze measured based on ISO 14782 of 1.0% or less.

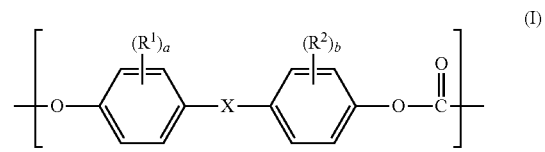

(I)

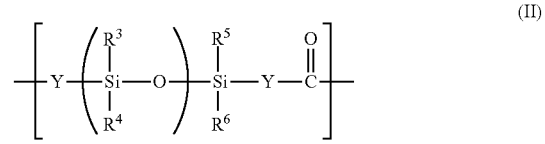

(II)

(In the formulae, $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of 0 to 4.

$R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue containing an aliphatic or aromatic moiety, and n represents an average repetition number.)

Examples of the halogen atom that $R^1$ and $R^2$ in the general formula (I) each independently represent include a fluorine atom, a chlorine atom, a bromine atom, and an iodine atom.

Examples of the alkyl group that $R^1$ and $R^2$ each independently represent include a methyl group, an ethyl group, an n-propyl group, an isopropyl group, various butyl groups ("various" means that a linear group and any branched group are included, and the same shall apply hereinafter), various pentyl groups, and various hexyl groups. An example of the alkoxy group that $R^1$ and $R^2$ each independently represent is an alkoxy group whose alkyl group moiety is the alkyl group described above.

The alkylene group represented by X is, for example, a methylene group, an ethylene group, a trimethylene group, a tetramethylene group, or a hexamethylene group, and is preferably an alkylene group having 1 to 5 carbon atoms. Examples of the alkylidene group represented by X include an ethylidene group and an isopropylidene group. The cycloalkylene group represented by X is, for example, cyclopentanediyl group, a cyclohexanediyl group, or a cyclooctanediyl group, and is preferably a cycloalkylene group having 5 to 10 carbon atoms. The cycloalkylidene group represented by X is, for example, a cyclohexylidene group, a 3,5,5-trimethylcyclohexylidene group, or a 2-adamantylidene group, and is preferably a cycloalkylidene group having 5 to 10 carbon atoms, more preferably a cycloalkylidene group having 5 to 8 carbon atoms.

a and b each independently represent an integer of 0 to 4, preferably 0 to 2, more preferably 0 or 1.

Examples of the halogen atom that $R^3$ to $R^6$ in the general formula (II) each independently represent include a fluorine atom, a chlorine atom, a bromine atom, and an iodine atom. Examples of the alkyl group or alkoxy group that $R^3$ to $R^6$ each independently represent include the same examples as those in the case of $R^1$ and $R^2$. Examples of the aryl group that $R^3$ to $R^6$ each independently represent include a phenyl group and a naphthyl group.

The organic residue containing an aliphatic moiety represented by Y is, for example, an alkylene group having 1 to 10 carbon atoms (preferably 1 to 6 carbon atoms, more preferably 1 to 3 carbon atoms). In addition, examples of the organic residue containing an aromatic moiety represented by Y include arylene groups each having 6 to 12 ring-forming carbon atoms such as a phenylene group, a naphthylene group, and a biphenyldiyl group.

The content of the constituent unit represented by the general formula (II) in the polycarbonate-polyorganosiloxane copolymer (A-1) is preferably 2 to 10 mass %, more preferably 3 to 7 mass %, still more preferably 3 to 6 mass %. As long as the content is 2 mass % or more, an improving effect on its impact strength is sufficient. In addition, as long as the content is 10 mass % or less, its heat resistance becomes good.

In addition, in the (A-1), the average repetition number (n) in the constituent unit represented by the general formula (II) is 25 to 50, preferably 28 to 50, more preferably 30 to 50, still more preferably 35 to 50. In the (A-1), when n is less than 25, the improving effect on the impact strength is not sufficient, and when n exceeds 50, excellent transparency is hardly obtained.

The (A-1) has a viscosity-average molecular weight (Mv) of preferably 16,000 to 30,000, more preferably 16,000 to 25,000, still more preferably 17,000 to 23,000. As long as the viscosity-average molecular weight of the (A-1) falls within the range, the strength of a molded article thereof becomes sufficient, the viscosity of the copolymer does not become excessively large and productivity at the time of its production becomes stable, and the copolymer can be easily molded into a thin-wall article.

The polycarbonate-polyorganosiloxane copolymer (A-1) of the present invention satisfies both the conditions (a) and (b), and is extremely excellent in transparency. A method of producing a polycarbonate-polyorganosiloxane copolymer including the following steps is suitable as a method of producing such polycarbonate-polyorganosiloxane copolymer (A-1).

In addition, in the condition (a), the haze is preferably 0.6% or less, more preferably 0.5% or less, still more preferably 0.4% or less. In the condition (b), the haze is preferably 0.8% or less, more preferably 0.7% or less, still more preferably 0.6% or less.

[Method of Producing Polycarbonate-Polyorganosiloxane Copolymer (A-1)]

A method of producing a polycarbonate-polyorganosiloxane copolymer of the present invention is performed by a continuous system as described below.

(i) The step of continuously or intermittently supplying a polycarbonate oligomer having the repeating unit represented by the general formula (I) and a water-insoluble organic solvent, and a polyorganosiloxane represented by the following general formula (2) and the water-insoluble organic solvent, followed by mixing in the absence of a polymerization catalyst and in the absence of an alkaline compound (excluding a tertiary amine and a quaternary ammonium salt).

(ii) The step of continuously or intermittently supplying and mixing the polymerization catalyst into a mixed liquid obtained in the step (i) in the absence of the alkaline compound (excluding a tertiary amine and a quaternary ammonium salt).

(iii) The step of continuously or intermittently supplying and mixing an alkaline compound aqueous solution into a mixed liquid obtained in the step (ii) to perform preliminary polymerization while setting the concentration of the alkaline compound aqueous solution to be supplied to 2 to 15 mass %.

(iv) The step of cooling a preliminary polymerization liquid obtained in the step (iii) to 25° C. or less, followed by continuous or intermittent supply and mixing of the polymerization catalyst, an alkaline compound aqueous solution of a dihydric phenol compound represented by the following general formula (1), and a molecular weight modifier into the liquid to perform main polymerization, followed by continuous or intermittent extraction of the resultant polymerization reaction liquid from a reactor.

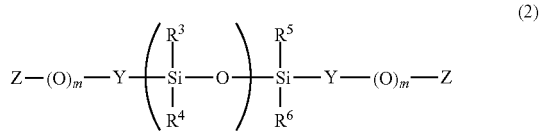

(2)

(In the formula: $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms; Y represents a single bond, or an organic residue containing an aliphatic or aromatic moiety; n represents an average repetition number; Z represents a halogen atom, $-R^7OH$, $-R^7-Z'-R^8-OH$, $-R^7COOH$, $-R^7NH_2$, $-COOH$, or $-SH$, the $R^7$ represents a substituted or unsubstituted alkylene group, a substituted or unsubstituted cycloalkylene group, or a substituted or unsubstituted arylene group, the $R^8$ represents an arylene group having 6 to 12 ring-forming carbon atoms, and the $Z'$ represents an alkylene group having 1 to 8 carbon atoms, an alkylidene group having 2 to 8 carbon atoms, a cycloalkylene group having 5 to 10 carbon atoms, or a cycloalkylidene group having 5 to 10 carbon atoms; and m represents 0 or 1.)

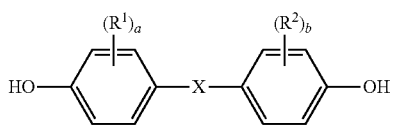

(1)

(In the formula: $R^1$ and $R^2$ each independently represent a halogen atom, an alkyl group having 1 to 6 carbon atoms, or an alkoxy group having 1 to 6 carbon atoms; X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—; and a and b each independently represent an integer of 0 to 4.)

Examples of the halogen atom represented by Z in the general formula (2) include a fluorine atom, a chlorine atom, a bromine atom, and an iodine atom. Among them, a chlorine atom is preferred.

Examples of the alkylene group represented by $R^7$ in —$R^7$OH, —$R^7$—Z'—$R^8$—OH, —$R^7$COOH, or —$R^7$NH$_2$ represented by Z include alkylene groups each having 1 to 10 (preferably 1 to 5) carbon atoms such as a methylene group, an ethylene group, a propylene group, a trimethylene group, and a pentamethylene group. In addition, examples of the cycloalkylene group represented by $R^7$ include cycloalkylene groups each having 3 to 10 (preferably 4 to 8) ring-forming carbon atoms such as a cyclopentylene group and a cyclohexylene group. Examples of the arylene group represented by $R^7$ include arylene groups each having 6 to 12 ring-forming carbon atoms such as a phenylene group, a naphthylene group, and a biphenyldiyl group.

$R^7$ may be substituted with an alkyl group having 1 to 5 carbon atoms, an alkoxy group having 1 to 5 carbon atoms, or an aryl group having 6 to 12 ring-forming carbon atoms. Examples of the alkyl group include a methyl group, an ethyl group, a propyl group, and various butyl groups. An example of the alkoxy group is an alkoxy group whose alkyl group moiety is the alkyl group described above. An example of the aryl group is a phenyl group.

Examples of the alkylene group, alkylidene group, cycloalkylene group, or cycloalkylidene group represented by Z' include the same examples as those in the case of X. Z' preferably represents an alkylidene group having 2 to 8 carbon atoms, and more preferably represents an isopropylidene group.

Examples of the dihydric phenol compound represented by the general formula (1) include: bis(hydroxyaryl)alkanes such as 2,2-bis(4-hydroxyphenyl)propane (trivial name: bisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-dichlorophenyl) propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; bis(4-hydroxyphenyl)diphenylmethane; dihydroxydiaryladamantanes such as 1,3-bis(4-hydroxyphenyl) adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentaene. Among them, 2,2-bis(4-hydroxyphenyl) propane (trivial name: bisphenol A) is preferred.

One of those dihydric phenol compounds may be used alone, or two or more thereof may be used as a mixture.

(Step (i))

In the step (i), the polycarbonate oligomer having the repeating unit represented by the general formula (I) (the average repetition number of the repeating units represented by the general formula (I) is 2 or more, preferably 2 to 5) and the polyorganosiloxane represented by the general formula (2) are caused to react with each other. When the oligomer is caused to react with the polyorganosiloxane represented by the general formula (2) in the coexistence of phosgene, a plurality of polyorganosiloxane chains are bonded to each other through a carbonyl group to produce an apparently long polyorganosiloxane chain, with the result that the transparency reduces. The method is important because complete prevention of such phenomenon gives high transparency. More specifically, it is preferred that a polycarbonate oligomer having a chloroformate group (CF group) at a terminal thereof be produced, and then the polycarbonate oligomer and the polyorganosiloxane represented by the general formula (2) be caused to react with each other.

The water-insoluble organic solvent to be used in the step (i) is preferably a halogenated hydrocarbon such as methylene chloride, chlorobenzene, or chloroform, more preferably methylene chloride.

It should be noted that it is important that in the step (i), the respective components be mixed in the absence of the polymerization catalyst to be described later and in the absence of the alkaline compound (excluding a tertiary amine and a quaternary ammonium salt) to be described later. Here, the phrase "in the absence of" means a state where any such material is substantially absent and the same shall apply hereinafter. As described above, the compatibility between the polyorganosiloxane represented by the general formula (2) and the polycarbonate oligomer having the repeating unit represented by the general formula (I) is low. Accordingly, when the polymerization catalyst or the alkaline compound is supplied without any prior mixing of the components, the reaction between the polycarbonate oligomer and the polyorganosiloxane "locally" progresses to partially produce a polymer chain having a high polyorganosiloxane concentration, and hence the transparency reduces.

It should be noted that in the step (i), the polyorganosiloxane and the polycarbonate oligomer upon mixing with the polyorganosiloxane are each dissolved or mixed in the water-insoluble organic solvent. The concentration of the polyorganosiloxane is set to preferably 10 to 30 mass %, more preferably 15 to 25 mass %. The solid content concentration of the polycarbonate oligomer solution is set to preferably 300 g/L or less, more preferably 170 to 250 g/L, still more preferably 180 to 240 g/L. Thus, the transparency of the polycarbonate-polyorganosiloxane copolymer can be improved. This is because of the following reason. The compatibility between the polyorganosiloxane and the polycarbonate oligomer is low, and hence when the polyorganosiloxane concentration or the polycarbonate oligomer concentration (solid content concentration) is excessively high, the polyorganosiloxane tends to exist in a dispersed state in the polycarbonate oligomer. When the polyorganosiloxane concentration is set to 10 to 30 mass % and the polycarbonate oligomer concentration is set to 300 g/L or less, the polyorganosiloxane can be quickly and sufficiently dissolved in the polycarbonate oligomer solution with ease. Accordingly, the uniformity of the polymerization reaction improves, whereby a polycarbonate-polyorganosiloxane copolymer excellent in transparency tends to be obtained.

A supply ratio (polycarbonate oligomer:polyorganosiloxane (each excluding the water-insoluble organic solvent)) (mass ratio per unit time) between the supply rate of the polycarbonate oligomer and the supply rate of the polyorganosiloxane is preferably 5:1 to 40:1, more preferably 7:1 to 35:1, still more preferably 9:1 to 30:1, particularly preferably 10:1 to 30:1.

The polyorganosiloxane represented by the general formula (2) can be easily produced by subjecting a phenol having an olefinically unsaturated carbon-carbon bond (preferably, for example, vinylphenol, allylphenol, eugenol, or isopropenylphenol) to a hydrosilanation reaction with a terminal of a polyorganosiloxane chain having a predetermined polymerization degree n. The phenol is more preferably allylphenol or eugenol. In this case, Y in the general formula (II) of the (A-1) or (A-2) represents an organic residue derived from allylphenol or eugenol.

Examples of the polyorganosiloxane represented by the general formula (2) include the following.

repetition number of organosiloxane constituent units and represents 25 to 50. In addition, c represents a positive integer and represents preferably an integer of 1 to 6, more preferably an integer of 1 to 3, still more preferably 3.

Among them, a phenol-modified polyorganosiloxane (preferably c=3) represented by the general formula (3) is preferred from the viewpoint of ease of polymerization. Further, an α,ω-bis [3-(o-hydroxyphenyl) propyl]polydimethylsiloxane as one of the compounds represented by the general formula (4), or an α,ω-bis [3-(4-hydroxy-3-methoxyphenyl) propyl]polydimethylsiloxane as one of the compounds represented by the general formula (5) is preferred from the viewpoint of ease of availability.

The phenol-modified polyorganosiloxane can be produced by a known method. For example, the following is available as the known production method.

Cyclotrisiloxane and disiloxane are caused to react with each other in the presence of an acid catalyst to synthesize an α,ω-dihydrogen organopolysiloxane. At this time, an α,ω-dihydrogen organopolysiloxane having a desired average repeating unit can be synthesized by changing a charging ratio between cyclotrisiloxane and disiloxane. Next, the α,ω-dihydrogen organopolysiloxane is subjected to an addition reaction with a phenol compound having an unsaturated aliphatic hydrocarbon group such as allylphenol or eugenol in the presence of a catalyst for a hydrosilylation reaction, whereby a phenol-modified polyorganosiloxane having a desired average repeating unit can be produced.

In addition, at this stage, a cyclic polyorganosiloxane having a low molecular weight and an excessive amount of the phenol compound remain as impurities. Accordingly, those low-molecular weight compounds are removed by distillation with heating under reduced pressure.

(Step (ii))

In the step (ii), the polymerization catalyst is continuously or intermittently supplied and mixed into a mixed liquid

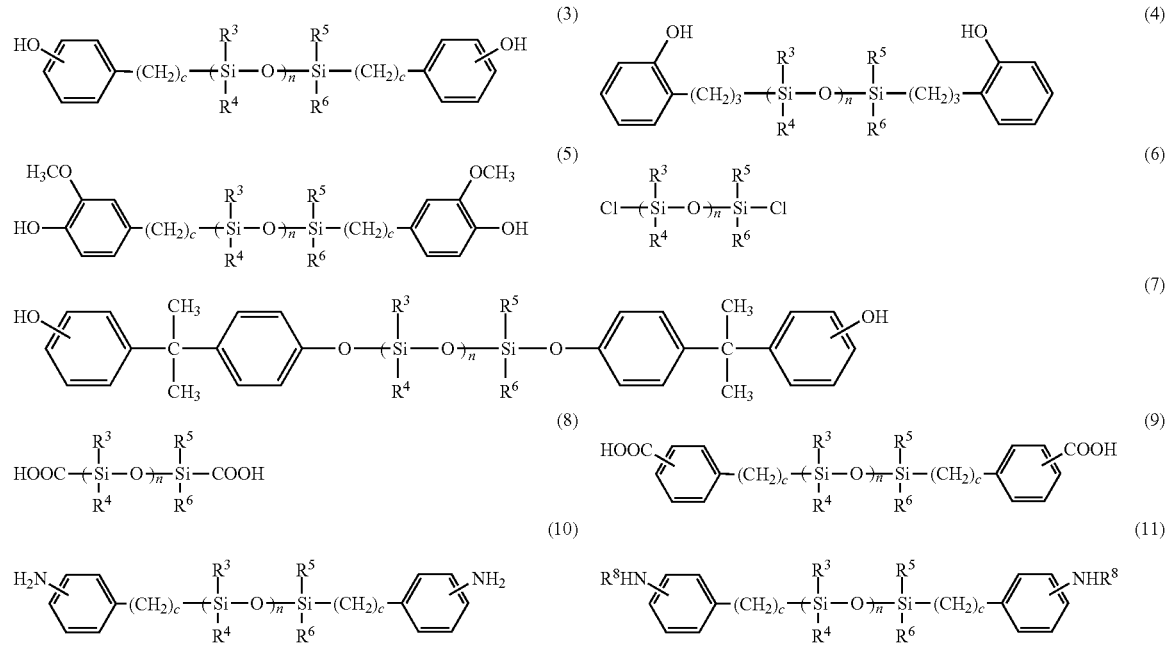

In the general formulae (3) to (11), $R^3$ to $R^6$ are identical to $R^3$ to $R^6$ in the general formula (1). n represents the average obtained in the step (i) (preferably a mixed liquid cooled to 25° C. or less (for example, about 15 to 20° C.)). At this time, the alkaline compound (excluding a tertiary amine and a quaternary ammonium salt) needs to be absent. The polymerization catalyst accelerates a reaction between a terminal group (such as a chloroformate group) of the polycarbonate oligomer and the polyorganosiloxane. Accordingly, when the polymerization catalyst is added in the presence of the alkaline compound, the reaction between the polycarbonate oligomer and the polyorganosiloxane "locally" progresses to partially produce a polymer chain having a high polyorganosiloxane concentration, and hence the transparency reduces.

Examples of the polymerization catalyst include a tertiary amine and a quarternary ammonium salt. Examples of the tertiary amine include trimethylamine, triethylamine, and tripropylamine. Examples of the quarternary ammonium salt include trimethylbenzylammonium chloride and triethylammonium chloride. The polymerization catalyst is preferably a tertiary amine, more preferably triethylamine.

In the step (ii), the polymerization catalyst is preferably used as a solution in a water-insoluble organic solvent from the viewpoint of improving the uniformity of the reaction to improve the transparency of the polycarbonate-polyorganosiloxane copolymer to be obtained. Examples of the water-insoluble organic solvent include the same examples as those described in the foregoing. Among them, methylene chloride is preferred from the viewpoint of an improvement in dispersibility of the polymerization catalyst. The concentration of the polymerization catalyst in the polymerization catalyst solution is preferably 0.05 to 5 mass %, more preferably 0.1 to 5 mass %, still more preferably 0.1 to 3 mass %, still more preferably 0.5 to 3 mass %, particularly preferably 0.5 to 2 mass %. It should be noted that the polymerization catalyst solution may contain water to such an extent that the transparency of the polycarbonate-polyorganosiloxane copolymer does not remarkably reduce, in other words, as long as the polycarbonate-polyorganosiloxane copolymer to be obtained satisfies the conditions (a), and (b).

(Step (iii))

Examples of the alkaline compound to be used in the step (iii) include: alkali metal hydroxides such as sodium hydroxide and potassium hydroxide; and alkaline earth metal hydroxides such as magnesium hydroxide and calcium hydroxide. Among them, an alkali metal hydroxide is preferred and sodium hydroxide is more preferred.

In the step (iii), the alkaline compound is used as an alkaline compound aqueous solution and the concentration (alkali concentration) of the alkaline compound aqueous solution to be supplied is controlled to 2 to 15 mass %. During the preliminary polymerization, the alkaline compound is consumed by three reactions, i.e., (1) a reaction between the polycarbonate oligomer and the polyorganosiloxane, (2) a reaction between a chloroformate group of the polycarbonate oligomer and a hydroxyl group, and (3) the decomposition reaction of a chloroformate group of the polycarbonate oligomer. When the alkali concentration of the alkaline compound aqueous solution to be supplied is higher than 15 mass %, the reaction (3) is liable to progress in terms of a reaction rate and an interfacial area becomes small, which leads to an increase in amount of an unreacted polyorganosiloxane. The alkali concentration of the alkaline compound aqueous solution to be supplied at the time of the preliminary polymerization is preferably 3 to 15 mass %, more preferably 3 to 12 mass %, still more preferably 3 to 10 mass %, still more preferably 5 to 10 mass %, particularly preferably 5 to 8 mass % from the viewpoints of the reaction efficiency of the polyorganosiloxane and the transparency of the polycarbonate-polyorganosiloxane copolymer.

In the step (iii), the preliminary polymerization of the polycarbonate oligomer and the polyorganosiloxane is performed in the absence of the dihydric phenol compound (such as bisphenol A) to be described later to be used during the main polymerization. The following leads to a reduction in amount of the unreacted polyorganosiloxane responsible for a reduction in transparency: the polyorganosiloxane and the dihydric phenol compound are in a competitive relationship with respect to reaction with polycarbonate oligomer, and the polycarbonate oligomer and the polyorganosiloxane are subjected to the preliminary polymerization in advance under such a condition that the dihydric phenol compound is absent. Therefore, it is preferred that in the steps (i) to (iii), the dihydric phenol compound be substantially not incorporated into a reaction system.

It should be noted that in the step (iii), the preliminary polymerization is performed by an interfacial polymerization reaction. The cases of the interfacial polymerization reaction are typically classified into two cases, i.e., the case where a continuous phase is an aqueous phase and the case where the continuous phase is a water-insoluble organic solvent phase. The water-insoluble organic solvent phase is preferably used as the continuous phase for obtaining a polycarbonate-polyorganosiloxane copolymer excellent in transparency. In order that the transparency may be obtained, the polyorganosiloxane and the polycarbonate oligomer each exist in the water-insoluble organic solvent phase for improving the uniformity of the reaction between the polyorganosiloxane and the polycarbonate oligomer, and hence the uniformity of each of both the polymers can be improved by stirring the polymers with the water-insoluble organic solvent phase as the continuous phase.

(Step (iv))

The step (iv) is a step performing the main polymerization. First, the preliminary polymerization liquid obtained in the step (iii) is cooled to 25° C. or less (preferably about 15 to 20° C.). Then, the polymerization catalyst, the alkaline compound aqueous solution of the dihydric phenol compound represented by the general formula (1), and the molecular weight modifier (chain-end terminator) are continuously or intermittently supplied and mixed into the liquid to perform the main polymerization.

Examples of the polymerization catalyst and the alkaline compound include the same examples as those described in the foregoing, and preferred examples thereof are also the same as those described in the above. The molecular weight modifier is not particularly limited as long as the modifier is a monohydric phenol, and examples thereof include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, a monoalkylphenol having a linear or branched alkyl group having an average number of carbon atoms of 12 to 35 at the ortho-, meta- or para-position, 9-(4-hydroxyphenyl)-9-(4-methoxyphenyl)fluorene, 9-(4-hydroxy-3-methylphenyl)-9-(4-methoxy-3-methylphenyl) fluorene, and 4-(1-adamantyl)phenol. Among them, p-t-butylphenol, p-cumylphenol, and p-phenylphenol are preferred and p-t-butylphenol is more preferred. It should be noted that the molecular weight modifier is dissolved in a water-insoluble organic solvent at a concentration of preferably 2 to 20 mass %, more preferably 4 to 15 mass %, still more preferably 4 to 12 mass % before use. Examples of the water-insoluble organic solvent include the same examples as those described in the above. Among them, methylene chloride is preferred.

(Treating Step)

After the completion of the main polymerization of the step (iv), the resultant polymerization reaction liquid is continuously or intermittently extracted from the reactor and then appropriately left at rest to be separated into an aqueous phase and a water-insoluble organic solvent phase [separating step], the water-insoluble organic solvent phase is washed (preferably washed with a basic aqueous solution, an acidic aqueous solution, and water in the stated order) [washing step], and the resultant organic phase is concentrated [concentrating step], pulverized [pulverizing step], and dried [drying step]. Thus, the polycarbonate-polyorganosiloxane copolymer (A-1) of the present invention can be obtained.

It should be noted that the basic aqueous solution to be used in the washing step is preferably an aqueous solution of an alkali metal hydroxide such as aqueous sodium hydroxide or aqueous potassium hydroxide. In addition, an aqueous solution of hydrochloric acid, phosphoric acid, or the like is preferred as the acidic aqueous solution.

In the drying step, in ordinary cases, the drying is preferably performed under reduced pressure at about 80 to 160° C.

(Polycarbonate Resin Composition)

A polycarbonate resin composition of the present invention contains a polycarbonate resin composed of 5 to 100 mass % of the polycarbonate-polyorganosiloxane copolymer (A-1) of the present invention and 0 to 95 mass % of an aromatic polycarbonate (A-2) except the (A-1).

The (A-2) corresponds to any aromatic polycarbonate except the (A-1).

An aromatic polycarbonate obtained by such a conventional method of producing an aromatic polycarbonate as described below can be used as the (A-2) in the polycarbonate-based resin composition of the present invention: an interfacial polymerization method involving causing a dihydric phenol compound and phosgene to react with each other in the presence of an organic solvent inert to the reaction and an alkali aqueous solution, and then adding a polymerization catalyst such as a tertiary amine or a quaternary ammonium salt to the resultant to perform polymerization, or a pyridine method involving dissolving the dihydric phenol compound in pyridine or a mixed solution of pyridine and the inert solvent, and introducing phosgene into the solution to produce the polycarbonate directly.

During the reaction, a molecular weight modifier (chain-end terminator), a branching agent, or the like is used as required.

Examples of the dihydric phenol compound to be used in the production of the (A-2) include the same examples as those of the dihydric phenol compound represented by the general formula (1), and preferred examples thereof are also the same as those described in the above. In addition, the (A-2) is preferably an aromatic polycarbonate obtained by a reaction between the dihydric phenol compound represented by the general formula (1) and phosgene. It should be noted that one of dihydric phenol compounds may be used alone, or two or more thereof may be used as a mixture.

Examples of the molecular weight modifier (chain-end terminator) include the same molecular weight modifiers as those exemplified in the step (iv). Two or more of molecular weight modifiers may be used in combination.

As the branching agent, there can be used a compound having three or more functional groups such as 1,1,1-tris(4-hydroxyphenyl)ethane, 4,4'-[1-[4-[1-(4-hydroxyphenyl)-1-methylethyl]phenyl]ethylidene]bisphenol, $\alpha,\alpha',\alpha''$-tris(4-hydroxyphenyl)-1,3,5-triisopropylbenzene, 1-[$\alpha$-methyl-$\alpha$-(4'-hydroxyphenyl)ethyl]-4-[$\alpha',\alpha'$-bis(4''-hydroxy phenyl)ethyl]benzene, phloroglucin, trimellitic acid, or isatinbis(o-cresol).

When the branching agent is used, the usage of the branching agent falls within the range of preferably 0.01 to 3 mol %, more preferably 0.1 to 1 mol % with respect to the dihydric phenol compound.

(Content Ratio Between (A-1) and (A-2))

As described in the above, the contents of the (A-1) and (A-2) in the polycarbonate resin to be incorporated into the polycarbonate resin composition of the present invention are as follows: the content of the (A-1) is 5 to 100 mass % and the content of the (A-2) is 0 to 95 mass %. When the content of the (A-1) in the polycarbonate resin is less than 5 mass %, the impact resistance and transparency of a molded article formed of the polycarbonate resin composition become insufficient.

From the same viewpoint as that described above, the content of the (A-1) in the polycarbonate resin is preferably 20 to 100 mass %, more preferably 30 to 100 mass %, still more preferably 40 to 100 mass %, particularly preferably 60 to 100 mass %, and the content of the (A-2) therein is preferably 0 to 80 mass %, more preferably 0 to 70 mass %, still more preferably 0 to 60 mass %, particularly preferably 0 to 40 mass %.

(Other Component)

Any known additive or the like to be incorporated into a polycarbonate resin composition can be incorporated into the polycarbonate resin composition of the present invention. Examples of the other component include a stabilizer, a UV absorber, an antistatic agent, an antioxidant, a lubricant, a release agent, and a flame retardant.

When the other component is blended into the polycarbonate resin composition of the present invention, its blending amount is preferably 20 parts by mass or less, more preferably 10 parts by mass or less, still more preferably 5 parts by mass or less with respect to 100 parts by mass of the polycarbonate-based resin.

The polycarbonate resin composition of the present invention can be obtained by blending and kneading the polycarbonate resin, and as required, the additives.

The blending and kneading can be performed by a generally used method such as a method comprising using a ribbon blender, a Henschel mixer, a Banbury mixer, a drum tumbler, a single-screw extruder, a twin-screw extruder, a co-kneader, a multi-screw extruder, or the like.

It should be noted that a heating temperature during the kneading is selected from the range of 250 to 320° C. in ordinary cases.

Any one of the conventionally known various molding methods such as an injection molding method, an injection compression molding method, an extrusion molding method, a blow molding method, a press molding method, a vacuum molding method, and a foam molding method can be employed in the molding of the polycarbonate resin composition of the present invention obtained as described above.

EXAMPLES

Examples of the present invention are further described. It should be noted that the present invention is by no means limited by these examples. It should be noted that in each example, a viscosity-average molecular weight (Mv), the amount of a polydimethylsiloxane (PDMS) residue, a viscosity number, a total light transmittance, a haze, and an Izod impact strength were determined by the following methods.

(1. Method of Measuring Viscosity-Average Molecular Weight (Mv))

A viscosity-average molecular weight was calculated from the following relational expression (Schnell's equation) by measuring the limiting viscosity [η] of a methylene chloride solution at 20° C. with an Ubbelohde-type capillary viscometer.

$$[\eta]=1.23\times10^{-5}\times Mv^{0.83}$$

(2. Amount of Polydimethylsiloxane (PDMS) Residue)

The amount of a PDMS residue was determined by proton NMR measurement of the proton of a methyl group of PDMS.

(3. Viscosity Number)

A viscosity number was measured in conformity with ISO 1628-4 (1999).

(4. Total Light Transmittance, Haze)

100 Parts by mass of a flake of a polycarbonate-polydimethylsiloxane copolymer obtained in each of Examples 1 to 6 and Comparative Examples 1 to 5 or a polycarbonate composition obtained in Example 7, and about 0.1 parts by mass of an antioxidant "IRGAFOS 168" (trade name, manufactured by BASF) were mixed, and then the mixture was granulated with a vented uniaxial extruder of 40 mmφ at a resin temperature of 280° C. to provide a pellet.

The resultant pellet was dried at 120° C. for 8 hours, and was then subjected to injection molding with an injection molding machine at a molding temperature of 280° C. and a die temperature of 80° C. to provide a three-stage plate formed of portions having thicknesses of 1 mm, 2 mm, and 3 mm. The total light transmittance of each of the portion having a thickness of 2 mm and the portion having a thickness of 3 mm was determined in accordance with ISO 13468 as the average of n measured values (n=3), and the haze of each of the portion having a thickness of 2 mm and the portion having a thickness of 3 mm was determined in accordance with ISO 14782 as the average of n measured values (n=3).

(5. Izod Impact Strength-Impact Resistance)

The pellet obtained in the section 4. was dried at 120° C. for 8 hours, and was then subjected to injection molding with an injection molding machine at a molding temperature of 280° C. and a die temperature of 80° C. to provide a test piece. Its notched Izod impact strengths at −30° C., 0° C., and 23° C. were measured in conformity with JIS-K-7110.

Synthesis Example 1

Synthesis of Polycarbonate Oligomer Solution

Added to a 5.6-mass % aqueous sodium hydroxide were 2,000 ppm by mass of sodium dithionite with respect to bisphenol A to be dissolved later. Bisphenol A was dissolved in the solution so that the concentration of bisphenol A became 13.5 mass %. Thus, a solution of bisphenol A in aqueous sodium hydroxide was prepared.

The solution of bisphenol A in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of a reaction liquid was kept at 40° C. or less by passing cooling water through the jacket.

The reaction liquid that had exited the tubular reactor was continuously introduced into a baffled vessel-type reactor having an internal volume of 40 L provided with a sweptback blade, and then 2.8 L/hr of the solution of bisphenol A in aqueous sodium hydroxide, 0.07 L/hr of a 25-mass % aqueous sodium hydroxide, 17 L/hr of water, and 0.64 L/hr of a 1-mass % aqueous solution of triethylamine were further added to the reactor to perform a reaction. The reaction liquid flowing out of the vessel-type reactor was continuously extracted, and then an aqueous phase was separated and removed by leaving the liquid at rest, followed by the collection of a methylene chloride phase.

The concentration of the polycarbonate oligomer solution (methylene chloride solution) thus obtained was 324 g/L and the concentration of a chloroformate group thereof was 0.74 mol/L. In addition, the weight-average molecular weight (Mw) of the polycarbonate oligomer was 1,190.

It should be noted that the weight-average molecular weight (Mw) was measured as a molecular weight (weight-average molecular weight: Mw) in terms of standard polystyrene by GPC (column: TOSOH TSK-GELMULTIPORE HXL-M (two)+ShodexKF801 (one), temperature: 40° C., flow speed: 1.0 ml/min, detector: RI) with tetrahydrofuran (THF) as a developing solvent.

Example 1

A polycarbonate-polydimethylsiloxane copolymer was continuously produced with a production apparatus illustrated in FIG. 1. A method for the production is specifically as described below.

The polycarbonate oligomer (PCO) solution produced in Synthesis Example 1 and methylene chloride (MC) were mixed in piping at flow rates shown in Table 1 (concentration of the polycarbonate oligomer: 223 g/L). Then, a solution (PDMS/MC) of an allylphenol terminal-modified polydimethylsiloxane (PDMS) in which the repetition number n of dimethylsiloxane units was 40 in methylene chloride was mixed with the mixture in the piping. After that, the contents were sufficiently mixed with a static mixer (step (i)) and then the mixed liquid was cooled to 19 to 22° C. with a heat exchanger.

The cooled mixed liquid was mixed with a solution (TEA/MC) of triethylamine (TEA) in methylene chloride in the piping and then the contents were sufficiently mixed with a static mixer (step (ii)). After that, a 6.4-mass % aqueous sodium hydroxide was added to the mixture immediately in front of a reactor (Rx-1), and then a reaction (preliminary polymerization) between the polycarbonate oligomer and the allylphenol terminal-modified PDMS was performed in the reactor (Rx-1) while a methylene chloride phase was used as a continuous phase (step (iii)). It should be noted that the reactor (Rx-1) was a mixer provided with a turbine blade and was operated at a number of rotations of 4,400 rpm.

The preliminary polymerization liquid that had exited the reactor (Rx-1) was cooled to 17 to 20° C. with a heat exchanger. After that, an aqueous solution (TEA/water) of triethylamine (TEA), a solution (PTEP/MC) of p-t-butylphenol (PTBP) in methylene chloride, and a solution of bisphenol A in aqueous sodium hydroxide (aqueous solution of BPNa) were mixed with the liquid in the piping immediately in front of a reactor (Rx-2), and then a polymerization reaction (main polymerization) was performed in the reactor (Rx-2) (step (iv)). It should be noted that the reactor (Rx-2) was a mixer provided with a turbine blade and was operated at a number of rotations of 4,400 rpm. The solution of p-t-butylphenol in methylene chloride used here had a concentration of 24 mass %, and the solution of bisphenol A in aqueous sodium hydroxide used here had a sodium hydroxide concentration of an aqueous solution in a state where bisphenol A was removed of 6.4 mass % and a bisphenol A concentration in the solution of bisphenol A in aqueous sodium hydroxide of 11.1 mass %.

The polymerization reaction liquid that had exited the reactor (Rx-2) was sequentially introduced into a reactor (Rx-3) and a reactor (Rx-4), and then the polymerization reaction was completed while its temperature was controlled to 38° C. or less. The reactor (Rx-3) is a reactor having an orifice plate and a cooling jacket, and the reactor (Rx-4) is a tower type of five-stage reactor having a cooling jacket.

35 Liters of the polymerization reaction liquid collected from the reactor (Rx-4) and 10 L of methylene chloride for dilution were charged into a 50-L vessel-type washing vessel provided with a baffle board and a paddle-type stirring blade, and were then stirred at 240 rpm for 10 minutes. After that, the mixture was left at rest for 1 hour to be separated into an organic phase containing the polycarbonate-polydimethylsiloxane copolymer, and an aqueous phase containing excessive amounts of bisphenol A and sodium hydroxide, followed by the isolation of the organic phase (separating step).

The solution of the polycarbonate-polydimethylsiloxane copolymer in methylene chloride thus obtained was sequentially washed with a 0.03-mol/L aqueous sodium hydroxide and 0.2-mol/L hydrochloric acid in amounts of 15 vol % each with respect to the solution. Next, the solution was repeatedly washed with pure water so that an electric conductivity in an aqueous phase after the washing became 0.1 mS/m or less (washing step).

The solution of the polycarbonate-polydimethylsiloxane copolymer in methylene chloride thus obtained was concentrated (concentrating step) and then pulverized, followed by the drying of the resultant flake under reduced pressure at 120° C. (drying step). The concentration of methylene chloride remaining in the resultant flake was 10 ppm or less. The amount of a residual Na ion measured by ICP/MS was less than 0.1 ppm.

Table 2 shows the respective physical properties of the resultant polycarbonate-polydimethylsiloxane copolymer.

Examples 2 to 4

Procedure was performed in the same manner as in Example 1 except that the flow rates of the respective raw materials and reagents were changed as shown in Table 1. Table 2 shows the respective physical properties of the resultant polycarbonate-polydimethylsiloxane copolymer.

Examples 5 and 6

Procedure was performed in the same manner as in Example 1 except that: the allylphenol terminal-modified polydimethylsiloxane was changed to an allylphenol terminal-modified polydimethylsiloxane having a repetition number n of dimethylsiloxane units shown in Table 1; and the flow rate of the polydimethylsiloxane was changed as shown in Table 1. Table 2 shows the respective physical properties of the resultant polycarbonate-polydimethylsiloxane copolymer.

Example 7

Polycarbonate Composition

65 Parts by mass of the flake of the polycarbonate-polydimethylsiloxane copolymer obtained in Example 1 and 35 parts by mass of an "FN1700A" (trade name, manufactured by Idemitsu Kosan Co., Ltd., a polycarbonate of bisphenol A having p-t-butylphenol as a terminal group, viscosity number=47.5, viscosity-average molecular weight (Mv)=17,700) were mixed to provide a polycarbonate composition. Table 2 shows the respective physical properties of the resultant polycarbonate composition.

Comparative Example 1

Retest of Patent Document 6 (JP 06-100684 A)

Procedure was performed in the same manner except that: the solution of triethylamine in methylene chloride was changed to an aqueous solution of triethylamine (having the same concentration); the 6.4-mass % aqueous sodium hydroxide was changed to a 25-mass % aqueous sodium hydroxide; and flow rates shown in Table 1 were adopted. Table 2 shows the respective physical properties of the resultant polycarbonate-polydimethylsiloxane copolymer.

Comparative Example 2

Retest of Patent Document 8 (JP 2005-60599 A)

15 Liters of the polycarbonate oligomer (PCO) solution produced in Synthesis Example 1, 8.9 kg of methylene chloride, 2.0 kg of a 20-mass % solution of an allylphenol terminal-modified polydimethylsiloxane (PDMS) in which the repetition number n of dimethylsiloxane units was 40 in methylene chloride, and 0.39 kg of a 1-mass % solution of triethylamine in methylene chloride were charged into a 50-L vessel-type reactor provided with a baffle board, a paddle-type stirring blade, and a cooling jacket, and were then stirred at 150 rpm. Under the stirring, 0.35 kg of a 25-mass % aqueous sodium hydroxide was added to the mixture to perform a reaction between the polycarbonate oligomer and the PDMS for 5 minutes.

1.7 Kilograms of an 8-mass % solution of p-t-butylphenol in methylene chloride were added to the resultant. Next, an alkali aqueous solution of bisphenol A (BPA) (obtained by dissolving 1.14 kg of BPA in 8.98 kg of a 6.4-mass % aqueous sodium hydroxide) was added to the resultant, and then the mixture was stirred at 240 rpm for 55 minutes.

10 Liters of methylene chloride were added to the mixture for dilution and then the mixture was stirred for an additional 10 minutes. After that, the mixture was left at rest for 1 hour to be separated into an organic phase containing a polycarbonate-polydimethylsiloxane copolymer, and an aqueous phase containing excessive amounts of bisphenol A and sodium hydroxide, followed by the isolation of the organic phase.

Table 1 shows the above production conditions. In addition, Table 2 shows the respective physical properties of the resultant polycarbonate-polydimethylsiloxane copolymer.

Comparative Example 3

The same polycarbonate continuous polymerization apparatus as that of Example 1 was used, and procedure was performed in the same manner except that: the respective raw materials were passed without stopping while the turbine blade was not rotated in the reactor (Rx-1); and the flow rates of the respective raw materials were set as shown in Table 1. Table 2 shows the respective physical properties of the resultant polycarbonate-polydimethylsiloxane copolymer.

Comparative Examples 4 and 5>

Procedure was performed in the same manner as in Example 1 except that: the allylphenol terminal-modified polydimethylsiloxane was changed to an allylphenol terminal-modified polydimethylsiloxane having a repetition number n of dimethylsiloxane units shown in Table 1; and the flow rates were changed as shown in Table 1. Table 2 shows the respective physical properties of the resultant polycarbonate-polydimethylsiloxane copolymer.

TABLE 1

| | | Unit | Example 1 | Example 2 | Example 3 | Example 4 | Example 5 | Example 6 |
|---|---|---|---|---|---|---|---|---|
| Average repetition number of PDMS units (n) | | — | 40 | 40 | 40 | 40 | 30 | 45 |
| Reaction System | | — | Continuous system | Continuous system | Continuous system | Continuous system | Continuous system | Continuous system |
| Flow rate | PCO*[1] | kg/hr | 26.0 | 26.0 | 26.0 | 26.0 | 26.0 | 26.0 |
| | MC | kg/hr | 11.8 | 12.5 | 13.1 | 13.1 | 11.8 | 12.5 |
| | (Step (i): PCO concentration) | g/L | 223 | 219 | 215 | 215 | 222 | 219 |
| | 20-Mass % PDMS/MC | kg/hr | 2.7 | 1.8 | 1.1 | 1.6 | 2.6 | 1.8 |
| | 1-Mass % TEA/MC | kg/hr | 0.52 | 0.52 | 0.52 | 0.52 | 0.52 | 0.52 |
| | 6.4-Mass % aqueous sodium hydroxide | kg/hr | 1.84 | 1.84 | 1.84 | 1.84 | 1.84 | 1.84 |
| | 1-Mass % TEA/water | kg/hr | 0.18 | 0.18 | 0.18 | 0.18 | 0.18 | 0.18 |
| | 8-Mass % PTBP/MC | kg/hr | 2.3 | 2.3 | 2.3 | 1.8 | 2.4 | 2.4 |
| | Aqueous solution of BPNa | kg/hr | 13.5 | 13.5 | 13.5 | 13.5 | 13.5 | 13.5 |
| Continuous phase | | | MC phase | MC phase | MC phase | MC phase | MC phase | MC phase |

| | | Unit | Comparative Example 1 | Comparative Example 2 | Comparative Example 3 | Comparative Example 4 | Comparative Example 5 |
|---|---|---|---|---|---|---|---|
| Average repetition number of PDMS units (n) | | — | 40 | 40 | — | 17 | 53 |
| Reaction System | | — | Continuous system | Batch system | Continuous system | Continuous system | Continuous system |
| Flow rate | PCO*[1] | kg/hr | 26.0 | 19.5*[4] | 26.0 | 26.0 | 26.0 |
| | MC | kg/hr | 11.8 | 8.9*[4] | 13.9 | 13.3 | 13.3 |
| | (Step (i): PCO concentration) | g/L | 223 | 222 | 211 | 214 | 214 |
| | 20-Mass % PDMS/MC | kg/hr | 2.7 | 2.0*[4] | 0 | 1.1 | 1.1 |
| | 1-Mass % TEA/MC | kg/hr | 0.52(*[2]) | 0.39*[4] | 0 | 0.52 | 0.52 |
| | 6.4-Mass % aqueous sodium hydroxide | kg/hr | 0.47(*[3]) | 0.35*[4] | 0 | 1.84 | 1.84 |
| | 1-Mass % TEA/water | kg/hr | 0.18 | 0.13*[4] | 0.18 | 0.18 | 0.18 |
| | 8-Mass % PTBP/MC | kg/hr | 2.3 | 1.7*[4] | 2.4 | 2.0 | 2.1 |
| | Aqueous solution of BPNa | kg/hr | 13.5 | 10.1*[4] | 15.4 | 13.5 | 13.5 |
| Continuous phase | | kg/hr | MC phase | MC phase | MC phase | MC phase | MC phase |

*[1] The PCO solution obtained in Synthesis Example 1 (solvent: MC)
(*[2]) Supplied as a 1-mass % aqueous solution of TEA
(*[3]) Supplied as a 25-mass % aqueous sodium hydroxide
*[4] Unit: kg The abbreviations in Table 1 are as follows:
PDMS unit: polydimethylsiloxane unit,
PCO: polycarbonate oligomer,
MC: methylene chloride,
PDMS/MC: solution of allylphenol terminal-modified polydimethylsiloxane in methylene chloride,
TEA/MC: solution of triethylamine in methylene chloride,
TEA/water: aqueous solution of triethylamine,
PTBP/MC: solution of p-t-butylphenol in methylene chloride, and
Aqueous solution of BPNa: solution of bisphenol A in aqueous sodium hydroxide

TABLE 2

| | | Unit | Example 1 | Example 2 | Example 3 | Example 4 | Example 5 | Example 6 | Example 7 |
|---|---|---|---|---|---|---|---|---|---|
| Measured result | Amount of PDMS residue | Mass % | 6.3 | 4.1 | 2.5 | 3.8 | 6 | 4.1 | 4.0 |
| | Viscosity number | — | 47.7 | 47.5 | 47.7 | 56.1 | 47.0 | 47.0 | 47.7 |
| | Viscosity-average | — | 17,800 | 17,700 | 17,800 | 21,500 | 17,500 | 17,500 | 17,700 |

TABLE 2-continued

| | | | | | | | | |
|---|---|---|---|---|---|---|---|---|
| molecular weight (Mv) | | | | | | | | |
| Total light transmittance at a thickness of 3 mm | % | 89.9 | 90.2 | 89.9 | 89.8 | 90 | 89.2 | 89.8 |
| Haze at a thickness of 3 mm | % | 0.4 | 0.5 | 0.3 | 0.4 | 0.4 | 0.6 | 0.5 |
| Total light transmittance at a thickness of 2 mm | % | 90.2 | 90.5 | 90.3 | 90.1 | 90.1 | 89.5 | 89.9 |
| Haze at a thickness of 2 mm | % | 0.3 | 0.3 | 0.3 | 0.4 | 0.3 | 0.4 | 0.4 |
| Izod impact strength (23° C.) | kJ/m$^2$ | 77 | 84 | 76 | 95 | 77 | 84 | 84 |
| Izod impact strength (0° C.) | kJ/m$^2$ | 75 | 79 | 74 | 93 | 70 | 80 | 80 |
| Izod impact strength (−30° C.) | kJ/m$^2$ | 62 | 33 | 20 | 85 | 55 | 35 | 35 |

| | | Unit | Comparative Example 1 | Comparative Example 2 | Comparative Example 3 | Comparative Example 4 | Comparative Example 5 |
|---|---|---|---|---|---|---|---|
| Measured result | Amount of PDMS residue | Mass % | 6.3 | 6.2 | 0 | 2.5 | 2.5 |
| | Viscosity number | — | 47.7 | 47.7 | 47.0 | 51.6 | 51.3 |
| | Viscosity-average molecular weight (Mv) | — | 17,800 | 17,800 | 17,500 | 19,500 | 19,400 |
| | Total light transmittance at a thickness of 3 mm | % | 89.8 | 89.8 | 90 | 90.8 | 90 |
| | Haze at a thickness of 3 mm | % | 1.0 | 1.0 | 0.5 | 0.4 | 0.9 |
| | Total light transmittance at a thickness of 2 mm | % | 89.7 | 89.7 | 90.0 | 90.0 | 90.1 |
| | Haze at a thickness of 2 mm | % | 0.8 | 0.8 | 0.5 | 0.5 | 0.8 |
| | Izod impact strength (23° C.) | kJ/m$^2$ | 77 | 76 | 75 | 27 | 82 |
| | Izod impact strength (0° C.) | kJ/m$^2$ | 76 | 75 | 68 | 10 | 77 |
| | Izod impact strength (−30° C.) | kJ/m$^2$ | 60 | 62 | 10 | 5 | 23 |

Table 2 shows that a polyorganosiloxane-polycarbonate copolymer obtained by the production method of the present invention is excellent in impact resistance, in particular, impact resistance at low temperature, and the copolymer satisfies the conditions (a) and (b), and is hence excellent in transparency.

Meanwhile, Comparative Example 1 in Table 2 shows that increasing the concentration of the aqueous sodium hydroxide in the step (iii) increases the haze. The haze increased even when the reaction system was not the continuous system but the batch system like Comparative Example 2. The impact resistance at a low temperature (−30° C.) was not obtained when the polyorganosiloxane was not copolymerized as in Comparative Example 3. When the average repetition number (n) of polydimethylsiloxane units was excessively small as in Comparative Example 4, the impact resistance at each temperature remarkably reduced, though excellent transparency was obtained. The haze increased when the average repetition number (n) of polydimethylsiloxane units was excessively large as in Comparative Example 5.

INDUSTRIAL APPLICABILITY

The polyorganosiloxane-polycarbonate copolymer obtained by the present invention is expected to find utilization in a wide variety of fields such as the field of electrical and electronic equipment, and the field of an automobile. In particular, the copolymer can be utilized as, for example, a material for the casing of a mobile phone, mobile personal computer, digital camera, video camera, electric power tool, or the like, or a material for other articles for daily use.

REFERENCE SIGNS LIST 1 to 4 reactor
5 mixer
6 solution of polycarbonate oligomer in methylene chloride
7 methylene chloride
8 solution of allylphenol terminal-modified polydimethylsiloxane in methylene chloride
9 solution of triethylamine in methylene chloride
10 aqueous sodium hydroxide
11 aqueous solution of triethylamine
12 solution of bisphenol A in aqueous sodium hydroxide
13 solution of p-t-butylphenol in methylene chloride

The invention claimed is:

1. A method of producing a polycarbonate-polyorganosiloxane copolymer, comprising:
  (i) continuously or intermittently supplying a polycarbonate oligomer comprising a repeating unit represented by formula (I) and a water-insoluble organic solvent, and a polyorganosiloxane represented by formula (2) and the water-insoluble organic solvent, followed by mixing in the absence of a polymerization catalyst and in the absence of an alkaline compound excluding a tertiary amine and a quaternary ammonium salt, thereby obtaining a first mixed liquid;
  (ii) continuously or intermittently supplying and mixing the polymerization catalyst into the first mixed liquid in the absence of the alkaline compound excluding a tertiary amine and a quaternary ammonium salt, thereby obtaining a second mixed liquid;

(iii) continuously or intermittently supplying and mixing an alkaline compound aqueous solution into the second mixed liquid to perform preliminary polymerization while setting a concentration of the alkaline compound aqueous solution to be supplied to 2 to 15 mass %, thereby obtaining a preliminary polymerization liquid; and (iv) cooling the preliminary polymerization liquid to a temperature of 25° C. or less, followed by continuous or intermittent supply and mixing of the polymerization catalyst, an alkaline compound aqueous solution of a dihydric phenol compound represented by formula (1), and a molecular weight modifier into the preliminary polymerization liquid to perform main polymerization to obtain a polymerization reaction liquid, followed by continuous or intermittent extraction of the polymerization reaction liquid from a reactor, wherein the polycarbonate-polyorganosiloxane copolymer comprises:

a main chain comprising a repeating unit represented by formula (I) and a constituent unit represented by formula (II):

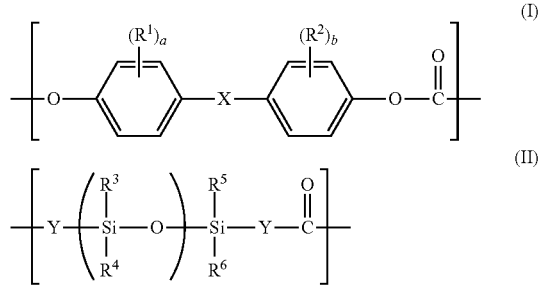

wherein:
$R^1$ and $R^2$ each independently represent a halogen atom, an alkyl group comprising 1 to 6 carbon atoms, or an alkoxy group comprising 1 to 6 carbon atoms;
X represents a single bond, an alkylene group comprising 1 to 8 carbon atoms, an alkylidene group comprising 2 to 8 carbon atoms, a cycloalkylene group comprising 5 to 15 carbon atoms, a cycloalkylidene group comprising 5 to 15 carbon atoms, —S—, —SO—, —SO$_2$—, —O—, or —CO—;
a and b each independently represent an integer of from 0 to 4;
$R^3$ to $R^6$ each independently represent a hydrogen atom, a halogen atom, an alkyl group comprising 1 to 6 carbon atoms, an alkoxy group comprising 1 to 6 carbon atoms, or an aryl group comprising 6 to 12 carbon atoms;
Y represents a single bond, or an organic residue comprising an aliphatic or aromatic moiety; and
n represents an average repetition number of from 25 to 50,
the polycarbonate-polyorganosiloxane copolymer satisfies the following conditions (a) and (b):
(a) a molded article having a thickness of 2 mm made of the copolymer has a total light transmittance measured based on ISO 13468 of 88% or more and a haze measured based on ISO 14782 of 0.7% or less; and
(b) a molded article having a thickness of 3 mm made of the copolymer has a total light transmittance measured based on ISO 13468 of 88% or more and a haze measured based on ISO 14782 of 1.0% or less,

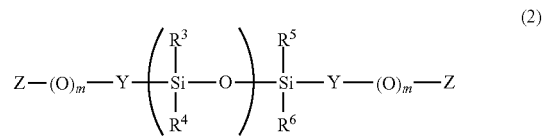

wherein:
$R^3$ to $R^6$ each independently represent a hydrogen atom, a halogen atom, an alkyl group comprising 1 to 6 carbon atoms, an alkoxy group comprising 1 to 6 carbon atoms, or an aryl group comprising 6 to 12 carbon atoms;
Y represents a single bond, or an organic residue comprising an aliphatic or aromatic moiety;
n represents an average repetition number;
Z represents a halogen atom, —R$^7$OH, —R$^7$—Z'—R$^8$—OH, —R$^7$COOH, —R$^7$NH$_2$, —COOH, or —SH, where $R^7$ represents a substituted or unsubstituted alkylene group, a substituted or unsubstituted cycloalkylene group, or a substituted or unsubstituted arylene group, $R^8$ represents an arylene group comprising 6 to 12 ring-forming carbon atoms, and Z' represents an alkylene group comprising 1 to 8 carbon atoms, an alkylidene group comprising 2 to 8 carbon atoms, a cycloalkylene group comprising 5 to 10 carbon atoms, or a cycloalkylidene group comprising 5 to 10 carbon atoms; and
m represents 0 or 1, and

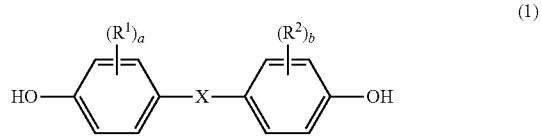

wherein:
$R^1$ and $R^2$ each independently represent a halogen atom, an alkyl group comprising 1 to 6 carbon atoms, or an alkoxy group comprising 1 to 6 carbon atoms;
X represents a single bond, an alkylene group comprising 1 to 8 carbon atoms, an alkylidene group comprising 2 to 8 carbon atoms, a cycloalkylene group comprising 5 to 15 carbon atoms, a cycloalkylidene group comprising 5 to 15 carbon atoms, —S—, —SO—, —SO$_2$—, —O—, or —CO—; and
a and b each independently represent an integer of from 0 to 4.

2. The method according to claim 1, wherein a terminal of the polycarbonate oligomer used in said supplying (i) comprises a chloroformate group.

3. The method according to claim 1, wherein the polymerization catalyst used in said supplying (ii) comprises a tertiary amine or a quaternary ammonium salt, or a methylene chloride solution thereof.

4. The method according to claim 1, wherein the water-insoluble organic solvent comprises methylene chloride.

5. The method according to claim 1, wherein, in the constituent unit represented by formula (II), Y represents an organic residue derived from allylphenol or eugenol.

6. The method according to claim 1, wherein, in the repeating unit represented by formula (I), X represents an isopropylidene group, and a=b=0.

7. The method according to claim 1, wherein, in the constituent unit represented by formula (II), each of $R^3$ to $R^6$ represents a methyl group.

* * * * *